(12) United States Patent
Thorndyke

(10) Patent No.: US 11,565,666 B1
(45) Date of Patent: Jan. 31, 2023

(54) LIFT SYSTEM FOR ELEVATING A LOAD BED OF A VEHICLE

(71) Applicant: Robert John Thorndyke, Newcastle (CA)

(72) Inventor: Robert John Thorndyke, Newcastle (CA)

( * ) Notice: Subject to any disclaimer, the term of this patent is extended or adjusted under 35 U.S.C. 154(b) by 0 days.

(21) Appl. No.: 17/697,432

(22) Filed: Mar. 17, 2022

(51) Int. Cl.
*B60S 9/12* (2006.01)
*B60P 1/64* (2006.01)

(52) U.S. Cl.
CPC .............. *B60S 9/12* (2013.01); *B60P 1/6445* (2013.01)

(58) Field of Classification Search
CPC .. B60P 1/6445; B60S 9/00; B60S 9/02; B60S 9/10; B60S 9/12; B66F 3/24; B66F 3/247; B66F 3/28; B66F 3/30; B66F 3/35; B66F 3/40; B66F 7/08; B66F 7/085; B66F 7/16; B66F 7/20
See application file for complete search history.

(56) References Cited

U.S. PATENT DOCUMENTS

| | | | |
|---|---|---|---|
| 5,340,141 A | 8/1994 | Thorndyke | |
| 5,409,251 A | 4/1995 | Thorndyke | |
| 5,509,687 A * | 4/1996 | Thorndike | B60S 9/12 254/419 |
| 6,895,648 B1 * | 5/2005 | Willett | B66F 3/247 254/93 VA |
| 7,665,788 B2 | 2/2010 | Dibdin et al. | |
| 2005/0127620 A1 | 6/2005 | Amundson | |
| 2006/0119089 A1 * | 6/2006 | Rivers | B60S 9/08 280/763.1 |
| 2017/0120879 A1 | 5/2017 | Koh | |

FOREIGN PATENT DOCUMENTS

| | | |
|---|---|---|
| CN | 212353929 U | 1/2021 |
| EP | 2619045 B1 | 9/2011 |
| WO | 2007049067 | 5/2007 |

(Continued)

OTHER PUBLICATIONS

English Translation of Chinese Utility Model No. 212353929, "Hydraulic support leg of semi-trailer".

(Continued)

*Primary Examiner* — Tyrone V Hall, Jr.
(74) *Attorney, Agent, or Firm* — Potomac Law Group, PLLC; Joseph F. Murphy

(57) ABSTRACT

A lift system for elevation of a load bed of a vehicle is disclosed. The lift system contains at least two pair of vehicle supports, each vehicle support comprising at least one extensible ground support stabilizer leg. The at least one extensible ground support stabilizer leg comprises a top portion coupled to an air bladder. The at least one extensible ground support stabilizer leg is configured to move along a vertical traction during movement from a fully retracted position to a fully extended position. A biasing element having at least one coil spring enclosed within the vertical housing of the extensible ground support stabilizer leg, configured to compress under tension when the extensible ground support stabilizer leg is extended and expand to release tension when the extensible ground support stabilizer leg is retracted.

12 Claims, 13 Drawing Sheets

(56) References Cited

FOREIGN PATENT DOCUMENTS

WO 2012056242 A1 5/2012

OTHER PUBLICATIONS

English Translation of European Patent No. 2619045, "Method for Retracting and Deploying a Landing Gear Device, and Landing Gear Device".
Patriot Lift Company, LLC, "ON-Lift Model 2000HD", onlift.com/on-lift-model-2000hd/ecomm-product-detail/295985.
PTS50 Pneumatic Landing Gear, https:www.youtube.com/watch?v=jREGPjCvnCc, May 13, 2015.

\* cited by examiner

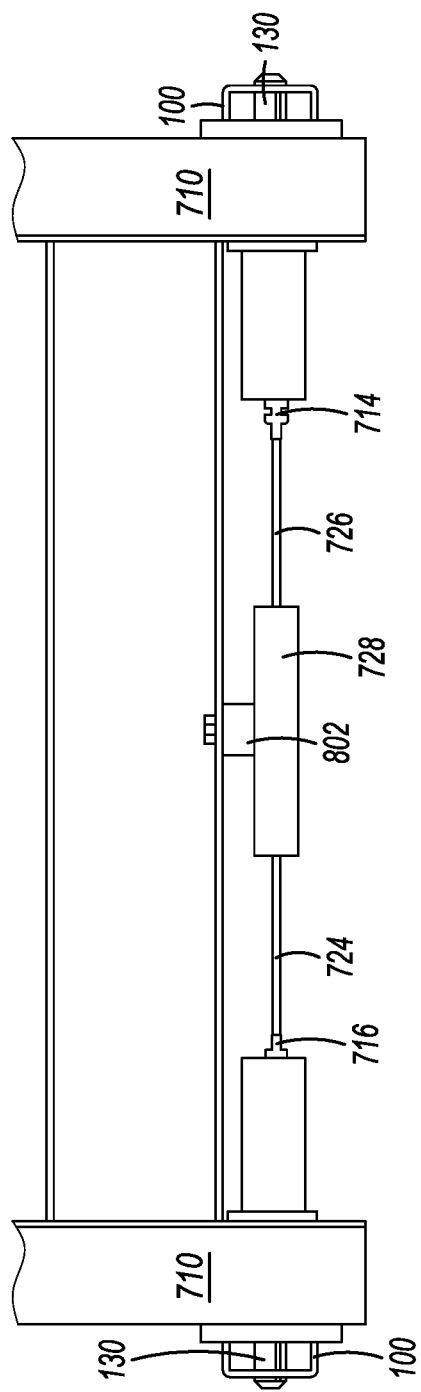

LIFT SYSTEM FOR ELEVATING A LOAD BED OF A VEHICLE

FIELD OF THE DISCLOSURE

This disclosure generally relates to vehicle bed loading and unloading techniques. More particularly, a lift system for elevating a load bed of a vehicle.

BACKGROUND OF THE DISCLOSURE

The subject matter discussed in this background section should not be assumed to be prior art merely as a result of its mention herein. Similarly, any problems mentioned in this background section or associated with the subject matter of this background section should not be assumed to have been previously recognized in the prior art. The subject matter as disclosed in this background section merely represents different approaches related to assemblies for lifting truck load beds, wherein such assemblies themselves may also correspond to implementations of the claimed technology.

In today's era, truck trailers may vary significantly depending on manufacturer and load requirements. The truck trailers are designed to transport international cargo containers that may vary in terms of the size of the load and length of the cargo containers. These truck trailers are designed to accommodate oversize cargo that would not normally fit into standard-sized freight trailers. The truck trailers are designed according to parameters such as, but not limited to, load-carrying capacity and dimensions of freights. Some examples of truck trailers may include but not limited to, platform trailers, gooseneck trailers, tanker trailers. The platform trailers are designed for transporting materials that must be loaded or unloaded from the top or side of the platform trailers. The gooseneck trailers are designed to accommodate oversized or special cargo much the same as the platform trailers. The tanker trailers are designed to carry fluid cargo. The cargos to be transported used in these trailers are specially designed and painted to withstand the effects of corrosive fluids.

Various systems for transporting loads with trucks have been known in the art. Specifically, load carriers with various truck trailers are tiltable in order to receive and discharge the load from the ground or platforms of various heights. A truck bed may be adjusted to the height of the ground or of a loading dock.

Current landing gear may include gear-driven devices manually operated by hand cranks requiring a certain level of operator physical strength to raise and lower the rear load bed, especially when the load bed of the vehicle is fully loaded. By removing the reliance on physical strength, the demographic for vehicle operators is greatly expanded and the risk of injury is reduced. Furthermore, reducing the time and increasing the ease of operation contributes to a safer, more efficient task in raising and/or lowering the load bed of a vehicle in order to match the coupler height of the tow vehicle and to provide a level load bed for forklift operators at a loading dock, given a forklift operator driving a forklift from/to a loading dock onto/from an unlevel load bed is extremely hazardous, and further reducing the risk of injury and increasing the speed and efficiency of loading and unloading a load bed of a vehicle from a loading dock.

The current market solutions for elevating the load bed of the vehicle, especially truck trailers or beds, all involve the use of the landing gear assembly. The landing gear assemblies are manually operated gear-driven devices operated by hand cranks that require a certain level of physical strength to raise the load bed, especially when the vehicle is fully loaded. Therefore, in light of the above discussion and given the deficiencies of the prior art, there is a need for a lifting system for the load bed of the vehicle that removes the reliance on the physical strength, contribute to the safer and more efficient task of raising or lowering the load bed to match the coupler height of the vehicle and provide the level load bed for the truck operators, thereby reducing the risk of injury and increasing the speed and the efficiency of the loading and the unloading of the vehicle.

SUMMARY OF THE DISCLOSURE

According to one aspect illustrated herein, a simple and efficient lift system used for a load bed of a vehicle is disclosed. The lift system comprises a first pair of spaced apart individual lifts proximate a front end of the vehicle and connected to said load bed of the vehicle, and a second pair of spaced apart individual lifts proximate to a rear end of said vehicle and connected to said load bed of the vehicle. Further, each individual lift comprising at least one extensible ground support stabilizer leg. In one alternative, the at least one extensible ground support stabilizer leg is enclosed within a vertical housing. The at least one extensible ground support stabilizer leg comprises a base portion at one end and an upper portion at another end. In one alternative, the upper portion is a top portion. Between said top portion and said base portion is a flanged portion. In another alternative, the base portion comprises a stabilizer plate. It can be noted that the base portion is a lower or bottom portion of the at least one extensible ground support stabilizer leg, and the upper portion is a top portion of the at least one extensible ground support stabilizer leg. Further, said top portion is coupled to an air bladder. The top portion is positioned proximate the load bed of the vehicle. The at least one extensible ground support stabilizer leg is configured to move from a fully retracted position to a fully extended position. It can be noted that the upper portion of the at least one extensible ground support stabilizer legs further acts as a load bed leveler by way of the air bladder, and the lower portion of said at least one extensible ground support stabilizer leg acts as a ground stabilizer. Further, each individual lift comprises a biasing element enclosed within the vertical housing of the at least one extensible ground support stabilizer leg. In one alternative, the biasing element comprises at least one coil spring configured to compress under tension when the base portion of said at least one extensible ground support stabilizer leg extends towards the ground surface. In one alternative, said biasing elements is situated around said at least one extensible ground support stabilizer leg and enclosed within said vertical housing and contained at one end by said flanged portion and at another end by a lower end of said vertical housing. Further, the at least one coil spring is configured to expand to release tension when the base portion of the at least one extensible ground support stabilizer leg is urged to retract back towards the vertical housing.

Further, each individual lift of the lift system comprises a support housing enclosing the air bladder and positioned over the vertical housing of the at least one extensible ground support stabilizer leg. In one alternative, the support housing is configured to move along a vertical traction or a vertical direction in an upward direction when the air bladder is inflated and a downward direction when the air bladder is deflated. Further, a top end of the support housing is in contact, preferably direct contact, with the load bed of the vehicle and is configured to lift the load bed from a first position to a second position when the air bladder is inflated and from the second position to the first position when the air bladder is deflated. The degree of air bladder inflation determining the extent of the second position in relation to the first position.

In one alternative, the biasing element is configured to hold the at least one extensible ground support stabilizer leg between the fully extended position and the fully retracted position and to force the at least one extensible ground support stabilizer leg back to the retracted position.

In another alternative, the at least one extensible ground support stabilizer leg further comprises releasable locking pins to secure the at least one extensible ground support stabilizer leg in extended, retracted, and other positions in between the fully extended position and the fully retracted position in relation to said vertical support. Further, the releasable locking pins are mounted out of a path of the at least one extensible ground support stabilizer leg when disengaged and projected into the at least one extensible ground support stabilizer leg when a pre-defined locking position is achieved.

According to another aspect, there is provided a dual-component system comprising at least two pairs of vehicle supports. Each vehicle support has at least one extensible ground support stabilizer leg. Further, each vehicle support comprises a main body with a top end and a bottom end. Further, each vehicle support has an air bladder encased in an enclosure having a top end and a bottom end which forces the at least one extensible ground support stabilizer leg away from the top end of the enclosure and towards the bottom end of the enclosure when the air bladder is inflated. It can be noted that the air bladder may be referred to as an airbag to be inflated or deflated using an internal air source or external air source. The main body comprises a restrictive passage to restrict the travel of the at least one extensible ground support stabilizer leg through the main body. Further, the at least one extensible ground support stabilizer leg comprises a biasing element disposed within the main body. It can be noted that the biasing element normally urges the at least one extensible ground support stabilizer leg to a retracted position within the main body. In one alternative, the at least one extensible ground support stabilizer leg may be releasably secured in a range of positions to allow for height adjustment to ensure stabilization of the vehicle along the ground surface and the desired height of the load bed.

According to another aspect, there is provided a lift system for elevating a load bed of a vehicle. The lift system comprises at least two pairs of spaced apart vehicle supports. Each of said spaced apart vehicle support comprising at least one extensible ground support stabilizer leg. According to another aspect, there is provided a first pair of spaced apart vehicle supports mounted at a rear of the vehicle load bed and a second pair of spaced apart vehicle supports mounted at a front of the vehicle load bed.

According to another aspect, each vehicle support comprises a main body housing an inflatable air bladder connected to a source of air pressure for receiving air to inflate the air bladder in turn urging the at least one extensible ground support stabilizer leg away from and normal to the load bed of a vehicle. In one alternative, the air pressure is from about 90 pounds per square inch to about 120 pounds per square inch. In one alternative, a biasing element is provided in each vehicle support to encourage each extensible ground support stabilizer leg back to a retracted position when not needed. In another aspect, releasable locking pins are provided to secure each extensible ground support stabilizer leg in a fully extended position when stabilizing the vehicle on the ground surface, fully retracted when not needed, and other positions in between fully extended and fully retracted. In one alternative each extensible ground support stabilizer leg may be locked at multiple positions.

In one alternative, each vehicle support of each of the spaced apart pair of vehicle supports is paired with sufficient distance between each other to support the vehicle load bed in a stable manner when each extensible ground support stabilizer leg is extended to the ground surface.

In another alternative, the releasable locking pins are actuated by an air cylinder for movement into and out of receiving openings in each of the extensible ground support stabilizer legs, mounted out of the path of each of the extensible ground support stabilizer legs when disengaged and projecting into each of the two pairs of extensible ground support stabilizer leg when a desired locking position is achieved. In one alternative, said air cylinder is a two-way air cylinder.

Further, one pair of the spaced apart vehicle supports is mounted transversely to cross-members of a vehicle at a rear of the vehicle, preferably a rear of a vehicle load bed, and a second pair of the spaced apart vehicle supports is mounted towards a front of the vehicle, preferably a front of a vehicle load bed.

In one alternative, each pair of the two pairs of vehicle supports are each secured to a face plate which is, in turn, secured to an angle beam. The angle beam is mounted on an underside of transverse beams which support the load bed of the vehicle. Each extensible ground support stabilizer leg extends downwardly with a first pin passage opening through an upper end thereof and a second pin passage opening through a lower end thereof such that the first pin passage opening is above the second pin passage opening. In one alternative, a pair of locking pins are carried by a longitudinal bar connecting each pair of the two pairs of vehicle supports and arranged to extend through the first pin passage opening and the second pin passage opening to lock each of the extensible ground support stabilizer legs in a fully retracted position, fully extended position, and positions between fully retracted and fully extended. In one alternative, each of said pair of locking pins are actuated by an air cylinder, in one alternative, a two-way air cylinder. In one alternative, an air bladder is secured within the enclosure at the top of the each of the two pairs of extensible ground support stabilizer legs. Further, each of the two pairs of extensible ground support stabilizer legs comprises a spring secured in the enclosure to facilitate the retraction of each of the two pairs of extensible ground support stabilizer leg. In one alternative, the air bladder is connected to an air system of the vehicle for inflation controlled by a valve mounted at driver side of the vehicle. In another alternative, one or more vents are provided to vent the air bladder when deflation is desired.

In another alternative, the releasable locking pins are slidably mounted in sleeves which are supported by a longitudinal beam located between each pair of vehicle supports. The face plate is welded to an inner edge of the angle beam and serves to support an inner end of the sleeve. The releasable locking pin comprises a collar that projects radially outwardly therefrom and serves to bear against the inner end of the sleeve to limit the outward movement of the releasable locking pin. The releasable locking pin comprises a portion of reduced diameter at an inner end. In one alternative, a tubular housing is secured to each of the two pairs of extensible ground support stabilizer legs and projects radially from the face plate and has an end wall which is formed with a passage that slidably receives a portion of reduced diameter. Further, a two-way air cylinder when activated in one direction serves to normally urge the releasable locking pins to an extended position. By activating the two-way air cylinder in another direction, the releasable locking pins are drawn inwardly so as to be fully withdrawn from the passage formed in each of the two pairs of extensible ground support stabilizer legs.

In one alternative, the load bed of the vehicle is in a lowered position when the vehicle is normally driven on a highway. The releasable locking pins project through the passages in each of the extensible ground support stabilizer legs and serve to lock each of the extensible ground support stabilizer legs in the retracted position.

In another alternative, when the load bed is to be elevated, the operator engages the two-way air cylinder in one direction to withdraw the releasable locking pins and after the releasable locking pins are withdrawn, the extensible ground support stabilizer leg is free to move and air is then supplied to the air bladder by activating an air control valve such that the air bladder is inflated to a first level to allow the extensible ground support stabilizer leg to extend downwards towards the ground surface until it reaches the ground surface. Each extensible ground support stabiliser leg is then locked in place upon reaching the ground surface by engaging the releasable locking pins into a passage. Additional air is then supplied to the air bladder by activating an air control valve. As a result, the air bladder expands and serve to elevate the load bed by creating a distance between the top of the extensible ground support stabilizer leg and the load bed. The load bed of the vehicle continues to be raised by the air bladder. It can be noted that the air bladders facilitate the alignment of the releasable locking pins with the passage and take into account any angular displacement of each of the vehicle supports as they are extended. Further, when the releasable locking pins extend through the passages, they serve to provide a positive lock that prevents both raising and lowering of the load bed without the operator. The two pairs of vehicle supports continue to function as non-compliant support legs until the air pressure in the air bladder is vented and the releasable locking pins are withdrawn to permit the vehicle load bed to return to the lowered position, at which time the releasable locking pins re-enter the passages and serve to lock each of the extensible ground support stabilizer legs in the retracted position.

From the foregoing, it will be apparent that the present disclosure provides a simple and inexpensive mechanism that provides for the rapid raising and lowering of both ends of the vehicle load bed in order to achieve the required alignment while ensuring that when the back end of the load bed is in the elevated position, it is retained in the elevated position by a non-compliant structure which provides a mechanical interlock which does not fail in the event of a failure of the elevating mechanism. The same applies to the front set when elevated to level the load bed of the vehicle. The air bladder of the present disclosure can be rapidly inflated and consequent return the vehicle to its previous level in a matter of seconds without physical exertion from the operator.

In one alternate alternative, the air bladder system provides a rapid rise with a low air pressure as related to the high surface area contact between the air bladders and load bed at one end of the bladder and the vehicle frame at the other end of the bladder. This is achieved in part because of the size of the air bladders and because the extensible air bladders are joined by a transverse bar across the vehicle frame. Based on the formula relating force (F), pressure (P), and area (A), $F = P \times A$, it may be seen that for a higher area, a lower pressure is required to generate a given force than that required to generate the same force across a smaller area Other features and aspects of this disclosure will be apparent from the following description and the accompanying drawings.

BRIEF DESCRIPTION OF THE DRAWINGS

While the specification concludes with claims particularly pointing out and distinctly claiming particular alternatives of the present disclosure, various alternatives of the present disclosure can be more readily understood and appreciated from the following descriptions of various alternatives of the present disclosure when read in conjunction with the accompanying drawings, in which:

FIGS. 7-8 illustrate a locking mechanism for use with the lift system, according to an exemplary alternative of the present disclosure.

DETAILED DESCRIPTION

Reference will now be made in detail to specific alternatives or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Some alternatives of this disclosure, illustrating all its features, will now be discussed in detail. The words "comprising," "having," "containing," and "including," and other forms thereof, are intended to be equivalent in meaning and be open-ended in that an item or items following any one of these words is not meant to be an exhaustive listing of such item or items or meant to be limited to only the listed item or items.

It must also be noted that as used herein and in the appended claims, the singular forms "a," "an," and "the" include plural references unless the context dictates otherwise. Although any systems and methods similar or equivalent to those described herein can be used in the practice or testing of alternatives of the present disclosure, the preferred systems, and methods are now described.

Alternatives of the present disclosure will be described more fully hereinafter with reference to the accompanying drawings in which like numerals represent like elements throughout the several figures, and in which example alternatives are shown. Alternatives of the present disclosure may, however, be embodied in alternative forms and should not be construed as being limited to the alternatives set forth herein. The examples set forth herein are non-limiting examples and are merely examples among other possible examples.

Figure 1:
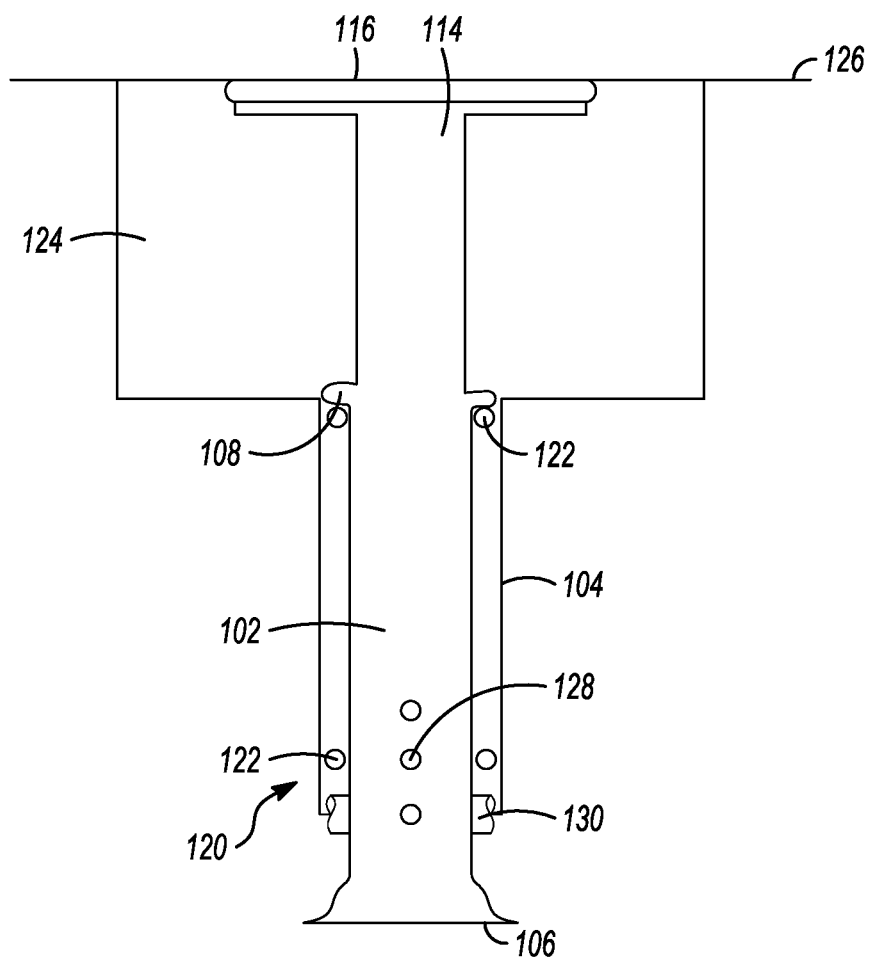
FIG. 1 illustrates a front cut-away view of one of a pair of spaced apart extensible supports of a lift system for elevating a load bed of a vehicle, in a fully retracted position, according to an alternative of the present disclosure.

Referring now to the figures, FIG. 1 illustrates a front cut-away view of one of a pair of spaced apart extensible supports of a lift system 100 for elevating a load bed of a vehicle, according to a first alternative of the present disclosure.

Each spaced apart extensible support/individual lifts of the pair of spaced apart extensible supports/individual lifts of the lift system 100 may comprise at least one extensible ground support stabilizer leg 102. The at least one extensible ground support stabilizer leg 102 may be enclosed in a vertical housing 104. In one alternative, the lift system 100 is positioned proximate to a rear-end of the load bed of the vehicle and a front end of the load bed of the vehicle. Further, the at least one extensible ground support stabilizer leg 102 may comprise a base portion 106 at one end and a flanged portion 108 at a middle area of the at least one extensible ground support stabilizer leg 102. It can be noted that the base portion 106 is a lower or bottom portion of the at least one extensible ground support stabilizer leg 102, and the flanged portion 108 is middle portion of the at least one extensible ground support stabilizer leg 102. The at least one extensible ground support stabilizer leg 102 further comprises a top portion 114. In one alternative, the top portion 114 may be coupled to an air bladder 116. In one alternative, the top portion 114 is a flat plate supporting the air bladder 116.

The at least one extensible ground support stabilizer leg 102 may be configured to move along a inside of the vertical housing 104 during a movement from a fully retracted position to a fully extended position. In one alternative, the at least one extensible ground support stabilizer leg 102 may move from the fully extended position to the fully retracted position along a inside path of the vertical housing 104 in a manner that the at least one extensible ground support stabilizer leg 102 may lift a load bed 126 away from a ground surface 118 when the air bladder 116 is being inflated. It can be noted that the at least one extensible ground support stabilizer leg 102 may act as a load bed leveler to move in relation to the load bed 126. It can also be noted that the at least one extensible ground support stabilizer leg 102 may be retracted or extended.

Further, the lift system 100 may comprise a biasing element 120 enclosed within the vertical housing 104 of the at least one extensible ground support stabilizer leg 102. The biasing element 120 may comprise at least one coil spring 122 to compress under tension when the at least one extensible ground support stabilizer leg 102 is extended towards the ground surface 118. Further, the at least one coil spring 122 may expand to release tension and the base portion 106 of the at least one extensible ground support stabilizer leg 102 may be urged to retract back towards support housing 124. In one alternative, the biasing element 120 may be configured to hold the at least one extensible ground support stabilizer leg 102 at a position between the fully retracted position (See FIGS. 1, 4A, 4B and 4C) and the fully extended position (See FIGS. 2, 5A, 5B and 5C). The biasing element, in this alternative the at least one coil spring 122 is secured in place at one end by the flanged portion 108 and the other end by a bottom of the vertical housing 104.

Further, the lift system 100 comprise the support housing 124 to enclose the air bladder 116. In one alternative, the support housing 124 may be referred to as a horizontal housing relative to the vertical housing 104 of the at least one extensible ground support stabilizer leg 102. It can be noted that the vertical housing 104 and the support housing 124 may be integrated as a single housing of a T-shaped structure. In one alternative, the vertical housing 104 may act as a support for the support housing 124 during extension and retraction of the at least one extensible ground support stabilizer leg 102. Further, the support housing 124 may be positioned over the vertical housing 104 of the at least one extensible ground support stabilizer leg 102. It can be noted that, the support housing 124 may be in direct contact with a load bed 126 of the vehicle and is configured to lift the load bed 126 when the air bladder 116 is inflated and the base portion 106 of the at least one extensible ground support stabilizer leg 102 is on the ground surface 118, as shown in FIGS. 2, 5A, 5B and 5C.

In one alternative, a plurality of coil springs 122 of the biasing element 120 may come under tension when the at least one extensible ground support stabilizer leg 102 is urged towards the ground surface 118.

Further, the at least one extensible ground support stabilizer leg 102 may comprise releasable locking pins 130 to secure the at least one extensible ground support stabilizer leg 102 in extended, retracted, and other positions in between the fully extended position and the fully retracted position. Further, the releasable locking pins 130 may be actuated manually or by an air cylinder for movement into and out of passages 128 in the at least one extensible ground support stabilizer leg 102. It can be noted that the passages 128 may be referred to as passages to receive the releasable locking pins 130 to keep the at least one extensible ground support stabilizer leg 102 in the extended position when the load bed 126 is being leveled up. In one alternative, the releasable locking pins 130 are mounted out of a path of the at least one extensible ground support stabilizer leg 102 when disengaged and projected into the at least one extensible ground support stabilizer leg 102 when a pre-defined locking position is achieved.

In one exemplary alternative, the lift system 100 is employed for elevating the load bed 126 of the vehicle. The load bed 126 may be elevated at a back end thereof to align the load with a loading dock and the ability to elevate and/or lower a front end to provide a level load bed 126 aligned with the loading dock. It may be extremely hazardous for an operator to drive a forklift truck from the loading dock into a vehicle that does not have a level load bed 126. Each of the support of the pairs of supports may be operated individually to accommodate for uneven ground surface in order to stabilize the vehicle. Furthermore, each air bladder 116 may be operated independently to accommodate for uneven ground surface or an uneven loading dock.

Figure 3:
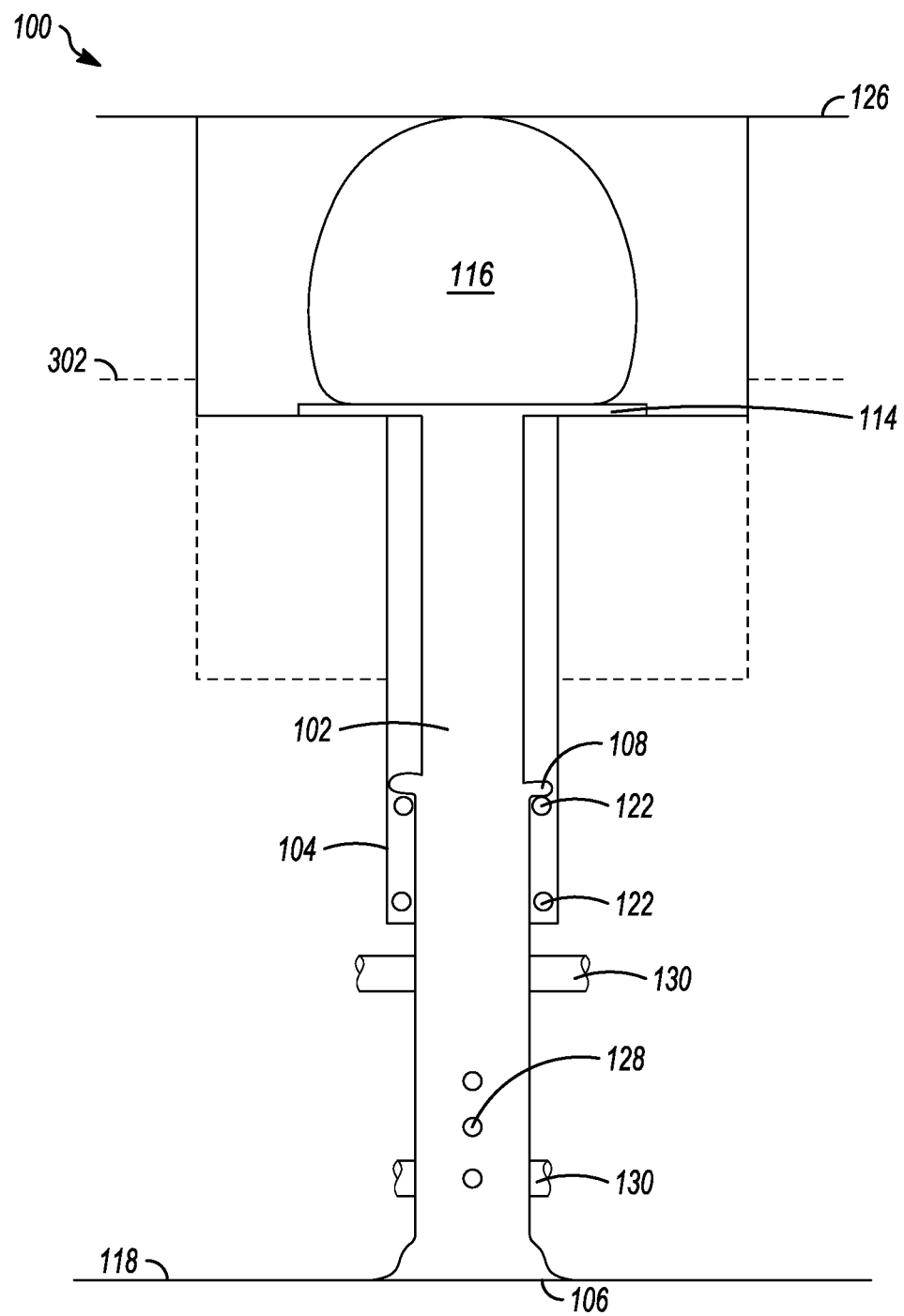
FIG. 3 illustrates a front cut-away view of one of the pair of spaced apart extensible supports of the lift system for elevating the load bed of the vehicle, in a fully extended position, depicting the extensible ground support stabilizer leg in an fully extended position and the air bladder further inflated with the load bed raised by the action of the further inflated air bladder according to an alternative of the present disclosure.

In one alternative, the air bladder 116 of each support may be inflated, by receiving air from an air source (See FIGS. 6A and 6B), to move the top portion 114 of the at least one extensible ground support stabilizer leg 102 away from the load bed 126 as shown in FIGS. 3, 4A, 4B and 4C, thereby moving the load bed 126 in an upward direction. It can be noted that the air bladder 116 may be in direct communication with the air source to inflate the air bladder 116 to lift the load bed 126 upwards. It can be noted that a datum line 302, as shown in FIG. 3, may be referred to as an initial or original position of the support housing 124 when the air bladder 116 is not inflated to level up the load bed 126. In one alternative, the air source may not necessarily be an air source, rather a fluid source, supplying a desired type of fluid that can be used to inflate and/or deflate the air bladder 116.

In one alternative, the lift system 100 may comprise a plurality of extensible ground support stabilizer legs configured to be retracted and extended using a plurality of biasing elements. Further, each of the plurality of extensible ground support stabilizer legs may be extended towards the ground surface 118 upon which the air bladder 116 may be inflated to lift or level the load bed 126. It can be noted that a vehicle may be provided with a plurality of lift systems towards the rear-end and the front-end of the load bed 126. It can also be noted that the number of lift systems for the vehicle depends upon the freight weight of the load bed 126 at the docking station. In one alternative, the at least one extensible ground support stabilizer leg 102 may be retracted and/or extended upon the deflation and inflation of the air bladder 116 positioned over the top portion 114 within the support housing 124.

In one alternative, the at least one extensible ground support stabilizer leg 102 may be mounted to the chassis at the bottom end of the vehicle. It can be noted that the at least one extensible ground support stabilizer leg 102 may be secured in a range of positions to allow for height adjustment of the load bed 126 of the vehicle. The at least one coil spring 122 may urge the releasable locking pins 130 to their extended position and consequently when the releasable locking pins 130 are aligned with passages 128, the at least one extensible ground support stabilizer leg 102 may be automatically driven to their extended position to extend through the passages 128. It can be noted that when the releasable locking pins 130 extend through the passages 128, the releasable locking pins 130 will serve to provide a positive lock which may prevent raising and lowering of the load bed 126 with respect to a wheel set frame of the vehicle.

In one alternate alternative, the lift system 100 may comprise a non-compliant leg means securely mounted to the chassis of the vehicle and extending therefrom to a position adjacent to the wheel set frame. A releasable extensible support position lock means (not shown) may be provided which may be operably coupled to the wheel set frame. The at least one extensible ground support stabilizer leg 102 may provide a lock that may be operable to lock the at least one extensible ground support stabilizer leg 102. Further, the chassis with respect to the wheel set frame of the vehicle, corresponds to the chassis being in the raised position. It can be noted that the at least one extensible ground support stabilizer leg 102 may continue to function as a non-compliant support leg until the releasable locking pins 130 are withdrawn and the air pressure in the air bladder 116 may be vented to permit the load bed 126 of the vehicle to return to its lowered position.

Figure 2:
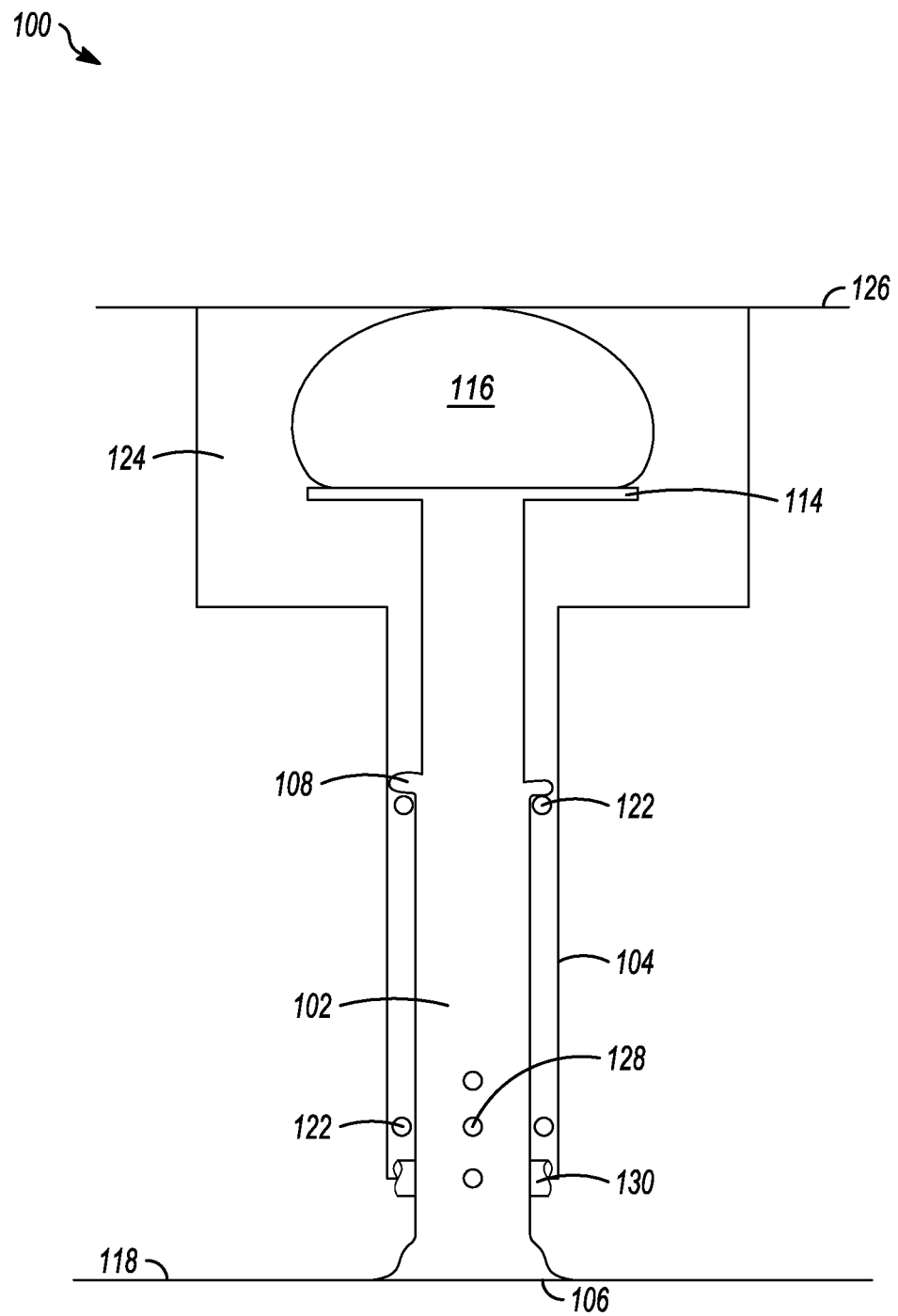
FIG. 2 illustrates another front cut-away view of one of the pair of spaced apart extensible supports of the lift system for elevating the load bed of the vehicle, depicting the extensible ground support stabilizer leg in an extended position making contact with the ground surface and stabilizing the vehicle on the ground surface with an air bladder partially inflated, according to an alternative of the present disclosure.

The operation of the lift system 100, as described in FIGS. 1-3, may be described in conjunction with FIG. 4A, FIG. 4B, FIG. 4C, FIG. 5A, FIG. 5B, and FIG. 5C. The at least one extensible ground support stabilizer leg 102 may be positioned at a predefined distance above the ground surface 118. It can be noted that the predefined distance may be equal to or more than the diameter of the wheel set of the vehicle. The air bladder 116 may be in direct communication with the air source to inflate and deflate the air bladder 116. In one alternative, at a first position, the at least one extensible ground support stabilizer leg 102 may be in a retracted position, the at least one extensible ground support stabilizer leg 102 may not be contacting the ground surface 118. The air bladder 116 may be deflated completely within the support housing 124, and the biasing element 120 with the at least one coil spring 122 may be in a released position or normal position. The at least one extensible ground support stabilizer leg 102 may be in the fully retracted position. At a second position, as shown in FIG. 2, the air bladder 116 is inflated slightly and the at least one extensible ground support stabilizer leg 102 may be extended downwards so that the base portion 106 may contact the ground surface 118 and the at least one coil spring 122 may be stressed under tension and may start forcing or pushing the flanged portion 108 of the at least one extensible ground support stabilizer leg 102 to retract back to normal position. In this case, the air bladder 116 may be partially inflated and the support housing 124 may be at the datum line 302. The at least one extensible ground support stabilizer leg 102 may be in a half retracted-half extended position.

Further, at a third position, as shown in FIG. 3, FIGS. 5A-5C, the base portion 106 of the at least one extensible ground support stabilizer leg 102 may be contacting the ground surface 118, and the at least one coil spring 122 of the biasing element 120 may be stressed under the flanged portion 108 of the at least one extensible ground support stabilizer leg 102. In this case, the air bladder 116 may be filled with more air or fluid from the air source. It can be noted that the air may be supplied to the air bladder 116 using manual operation or electric or mechanical actuation of a pump, as shown in FIGS. 6A-6B. The air bladder 116 may be inflated with the supplied air and therefore may raise the support housing 124 above the datum line 302. The support housing 124 may move in relation to the at least one extensible ground support stabilizer leg 102 by the action of the air bladder 116 pushing against the top of the support housing 124, resulting in the leveling of the load bed 126. The releasable locking pins 130 may be secured into the receiving opening or passage 128 to hold the at least one extensible ground support stabilizer leg 102 at a fixed position in relation to the vertical housing 104, when the air bladder 116 is inflated. The at least one extensible ground support stabilizer leg 102 may be in a fully extended position when the air bladder 116 is inflated (as shown in FIGS. 3, 5A, 5B and 5C) or deflated (as shown in FIGS. 2, 4A, 4B and 4C). The at least one coil spring 122 may be under complete tension and may urge the at least one extensible ground support stabilizer leg 102 back to the fully retracted position once the air from the air bladder 116 is completely deflated and the stabilization of the vehicle on the ground surface 118 is no longer required.

In an alternative, the air bladder 116 is advantageous over known hydraulic systems because the time for full expansion of the air bladder 116 is used to lift the rear end and the front end of the chassis and the load bed 126 to a maximum height at a certain value of air pressure in Pound-force per Square Inch (PSI). The known hydraulic ram structures need pressures of more than 2000 PSI and about 8-10 minutes in order to achieve the required elevation of the load bed 126 of the vehicle. The lift system 100 of the present disclosure is efficient and less expensive compared to the known hydraulic lifting systems and only require from about 90 pounds per square inch to 120 pounds per square inch pressure to operate the air bladder.

Figure 4A:
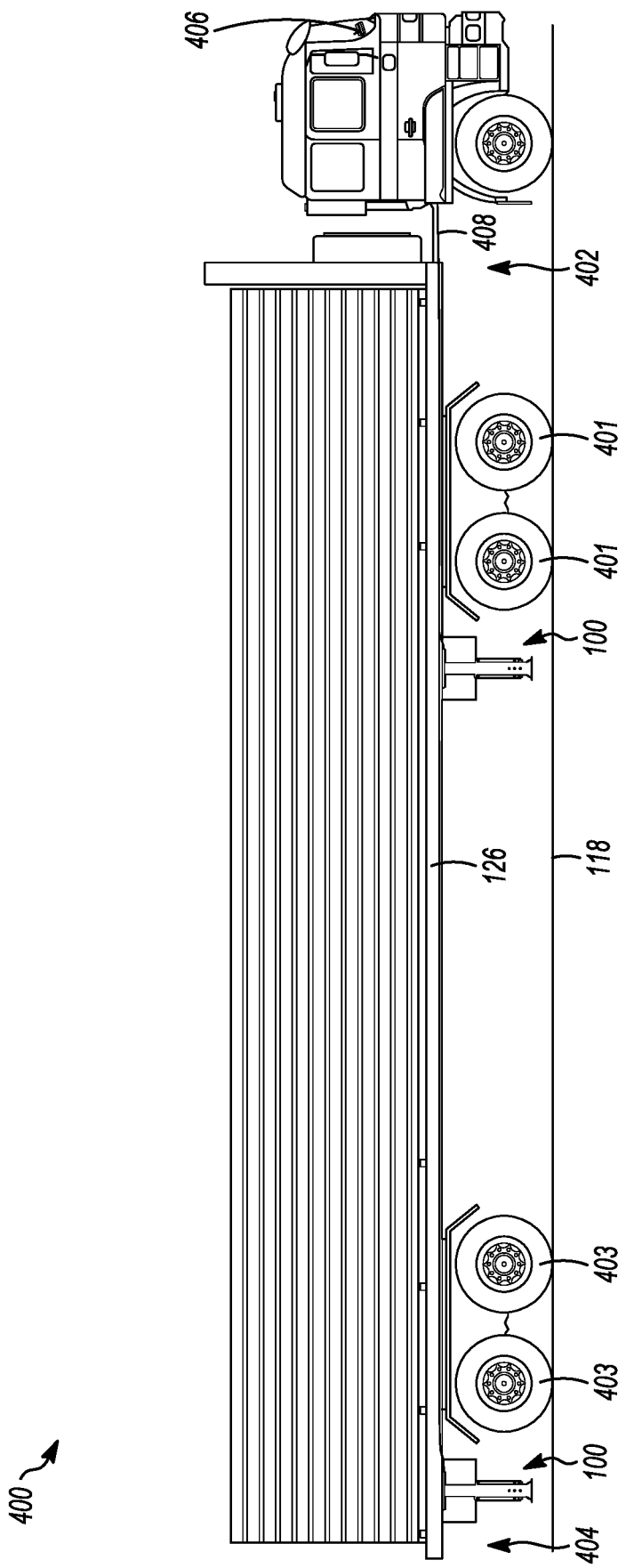
FIG. 4A illustrates a side view of a truck showing one side of the pair of spaced apart extensible supports of the lift system at a front of the load bed and a rear of the load bed, respectively, for the elevation of the load bed of the truck with the lift system fully retracted, according to an exemplary alternative of the present disclosure.
Figure 4B:
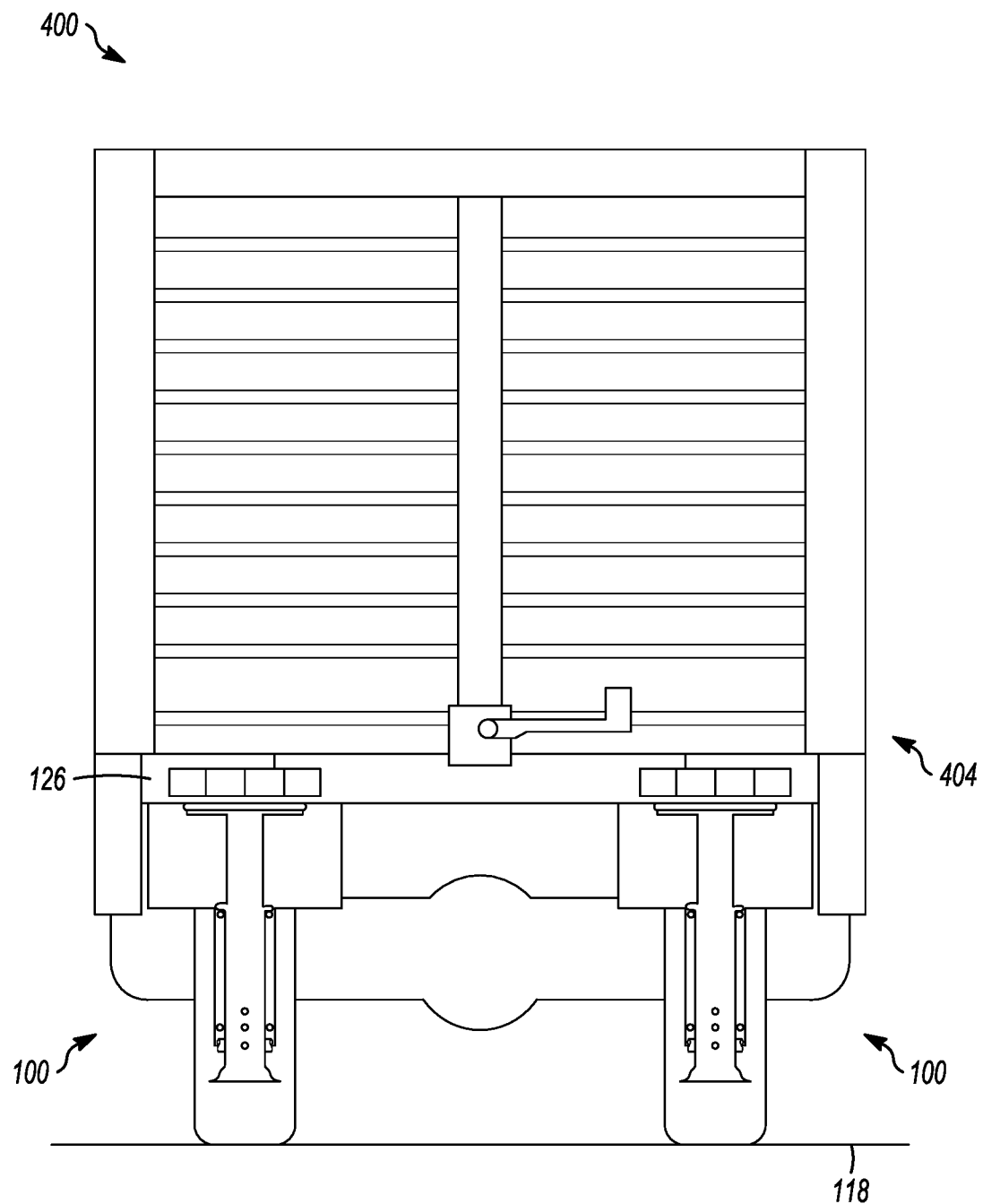
FIG. 4B illustrates a rear view of the truck showing the pair of spaced apart extensible supports of the lift system at the rear of the load bed and behind the rear wheels for the elevation of the load bed of the truck with the lift system fully retracted, according to an exemplary alternative of the present disclosure.
Figure 4C:
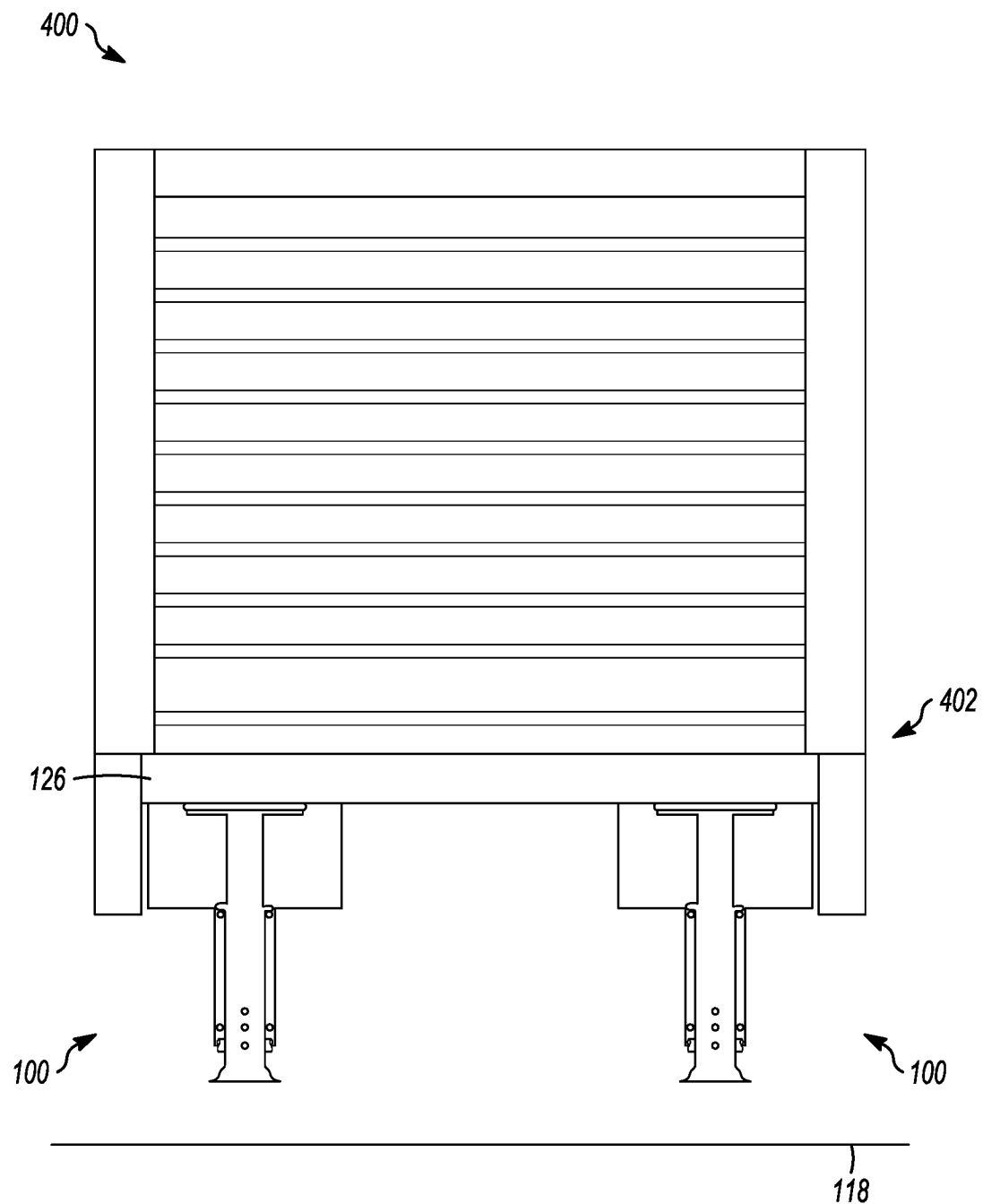
FIG. 4C illustrates a front view of the truck without the cab showing the pair of spaced apart extensible supports of the lift system at the front of the load bed and behind the front wheels for the elevation of the load bed of the truck with the lift system fully retracted, according to an exemplary alternative of the present disclosure.

FIGS. 4A-4C illustrate a truck 400 with the pair of spaced apart extensible supports of the lift system 100 at the front of the load bed 126 behind the front wheels and the rear of the load bed 126 behind the rear wheels, respectively, for the elevation of the load bed 126 of the truck 400 with the lift system 100 fully retracted, according to an exemplary alternative. It can be noted that the load bed 126 may also be referred to as a truck bed. The lift system 100 for the load bed 126 of the truck 400 may be attached proximate the front end 402 of the truck 400 behind the front wheels 401, as shown in FIG. 4C and proximate to the rear end 404 of the truck 400 behind the rear wheels 403, as shown in FIG. 4B with the support housing 124 coupled to the chassis. As shown in FIGS. 4A-4C, the at least one extensible ground support stabilizer leg 102 is in the fully retracted position, and the air bladder 116 within the support housing 124 is deflated completely. Further, each of the pair of spaced apart extensible supports of the lift system 100 may be provided with a control panel 406 coupled to the at least one extensible ground support stabilizer leg 102 of each lift system 100 using connection wires 408. Further, the control panel 406 may be positioned inside a driver cabin of the truck 400. The control panel 406 may be used to control the air pressure in the air bladders as well as to control the releasable locking pins 130.

In one alternative, the control panel 406 may be configured to move each of the pair of spaced apart extensible supports of the lift system 100 between the fully retracted position and the fully extended position. It can be noted that the truck 400 may employ the plurality of lift systems according to the length of the load bed 126 and the weight of freight. The at least one extensible ground support stabilizer leg 102 is positioned at the predefined distance above the ground surface 118. The air bladder 116 is in direct communication with the air source to inflate and deflate the air bladder 116. The at least one extensible ground support stabilizer leg 102 is in a retracted position, and the at least one extensible ground support stabilizer leg 102 is not contacting the ground surface 118. The air bladder 116 is deflated completely within the support housing 124, and the biasing element 120 with the at least one coil spring 122 is in a released position and the at least one extensible ground support stabilizer leg 102 is in the fully retracted position.

Figure 5A:
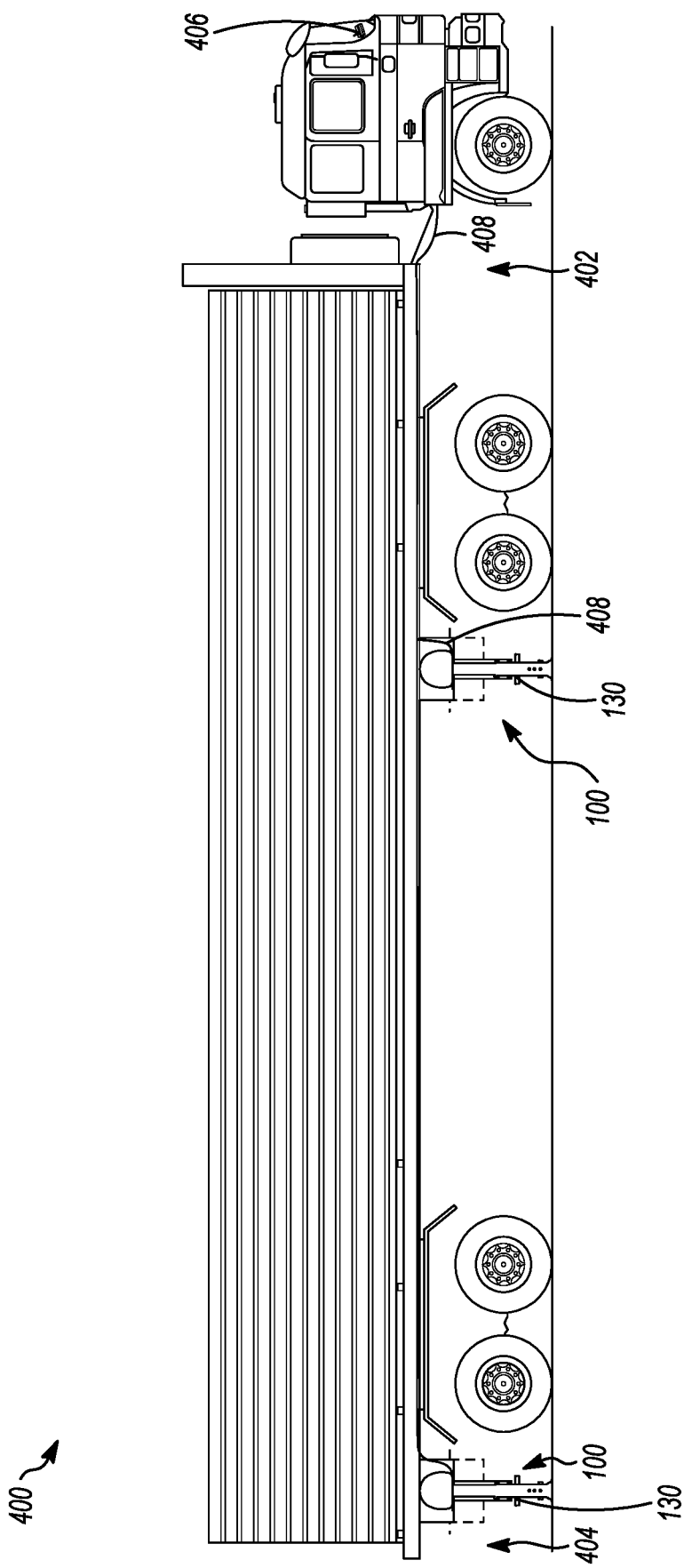
FIG. 5A illustrates another side view of the truck showing one side of the pair of spaced apart extensible supports of the lift system at the front of the load bed and the rear of the load bed, respectively, for elevation of a load bed of the truck with the lift system fully extended and the air bladder inflated and load bed elevated, according to an exemplary alternative of the present disclosure.
Figure 5B:
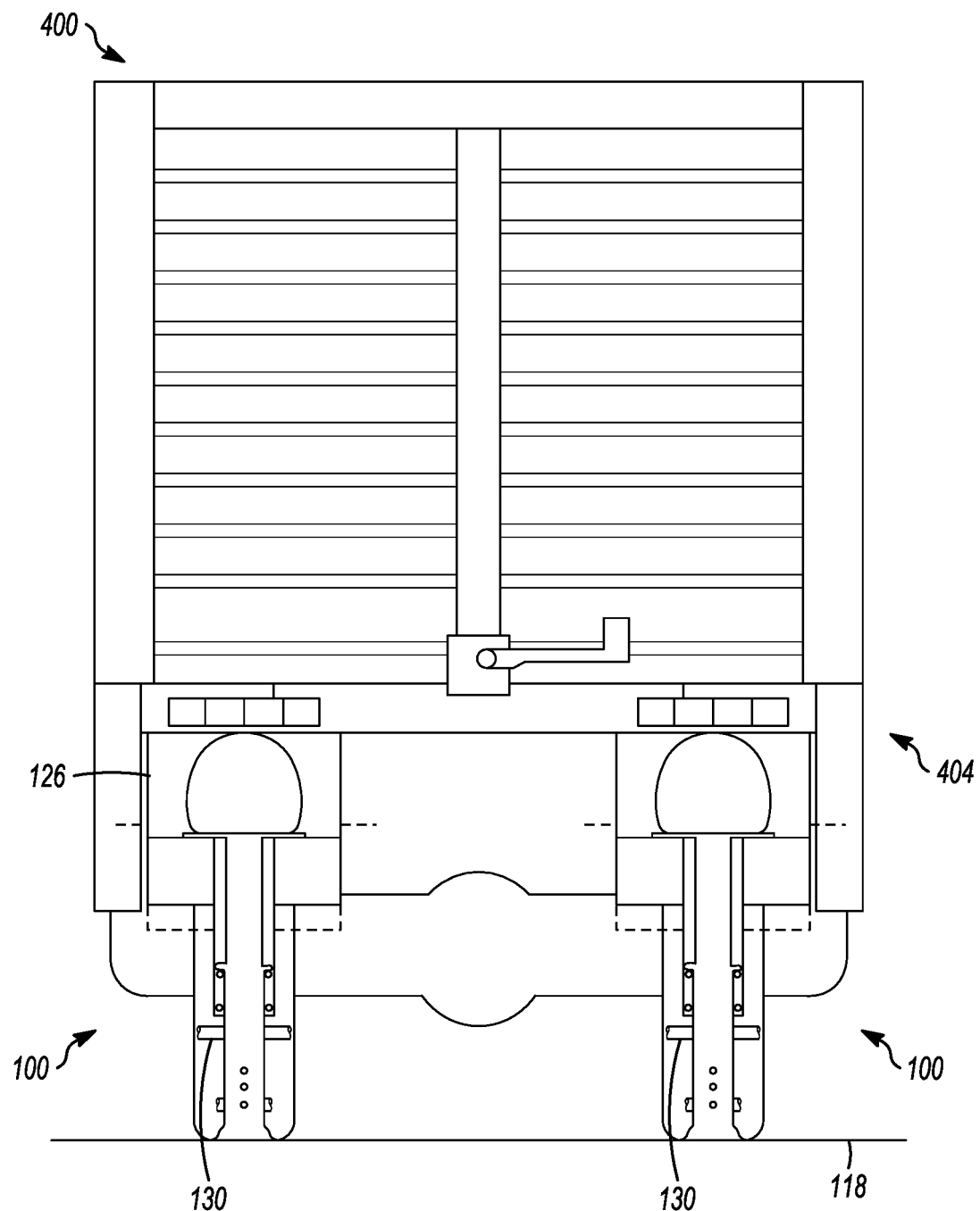
FIG. 5B illustrates a rear view of the truck showing the pair of spaced apart extensible supports of the lift system at the rear of the load bed and behind the load bed rear wheels, respectively, for elevation of a load bed of the truck with the lift system fully extended and the air bladder inflated and load bed elevated, according to an exemplary alternative of the present disclosure.
Figure 5C:
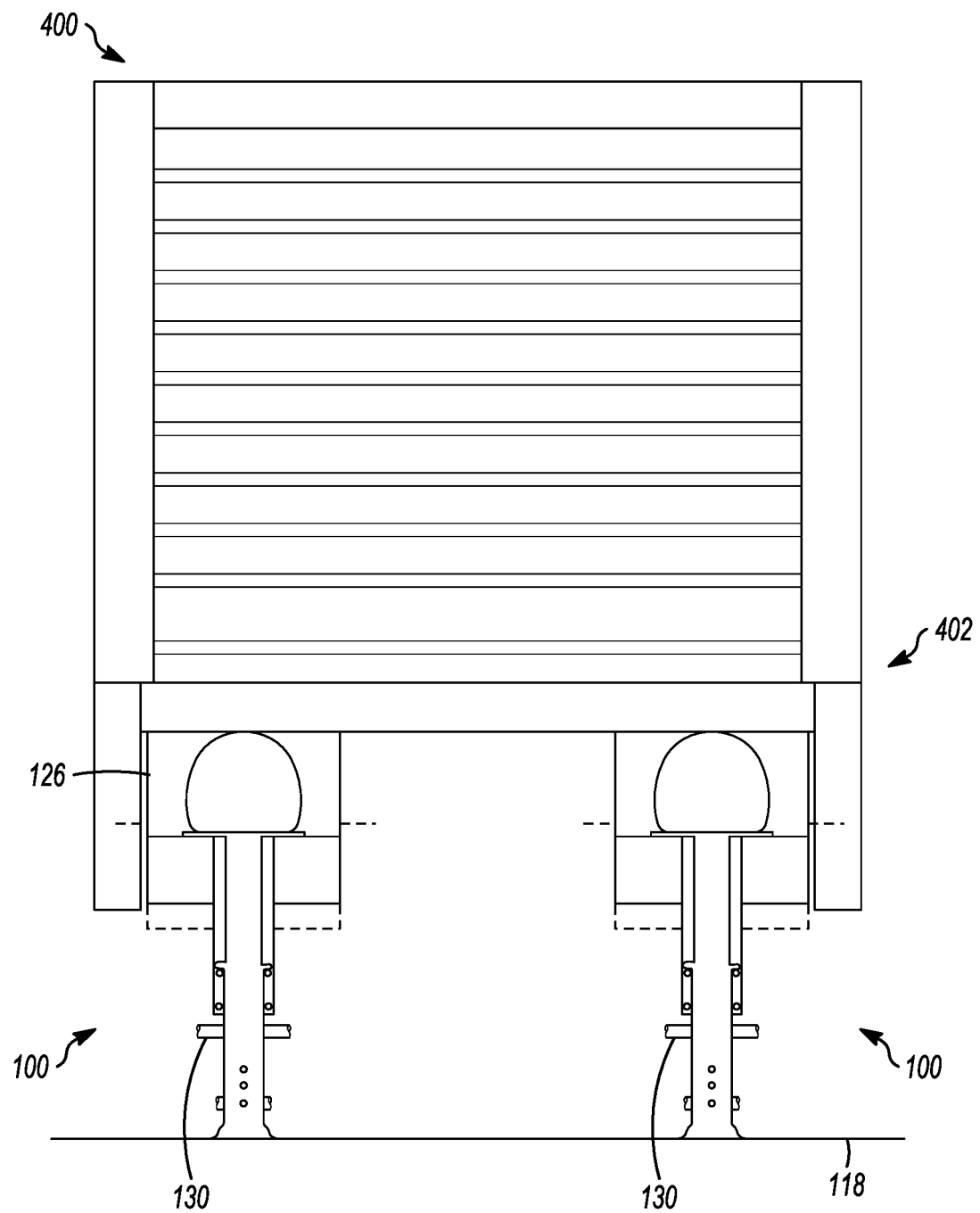
FIG. 5C illustrates a front view of the truck without the cab showing the pair of spaced apart extensible supports of the lift system at the front of the load bed and behind the load bed front wheels, respectively, for elevation of a load bed of the truck with the lift system fully extended and the air bladder inflated and load bed elevated, according to an exemplary alternative of the present disclosure.
Figure 6A:
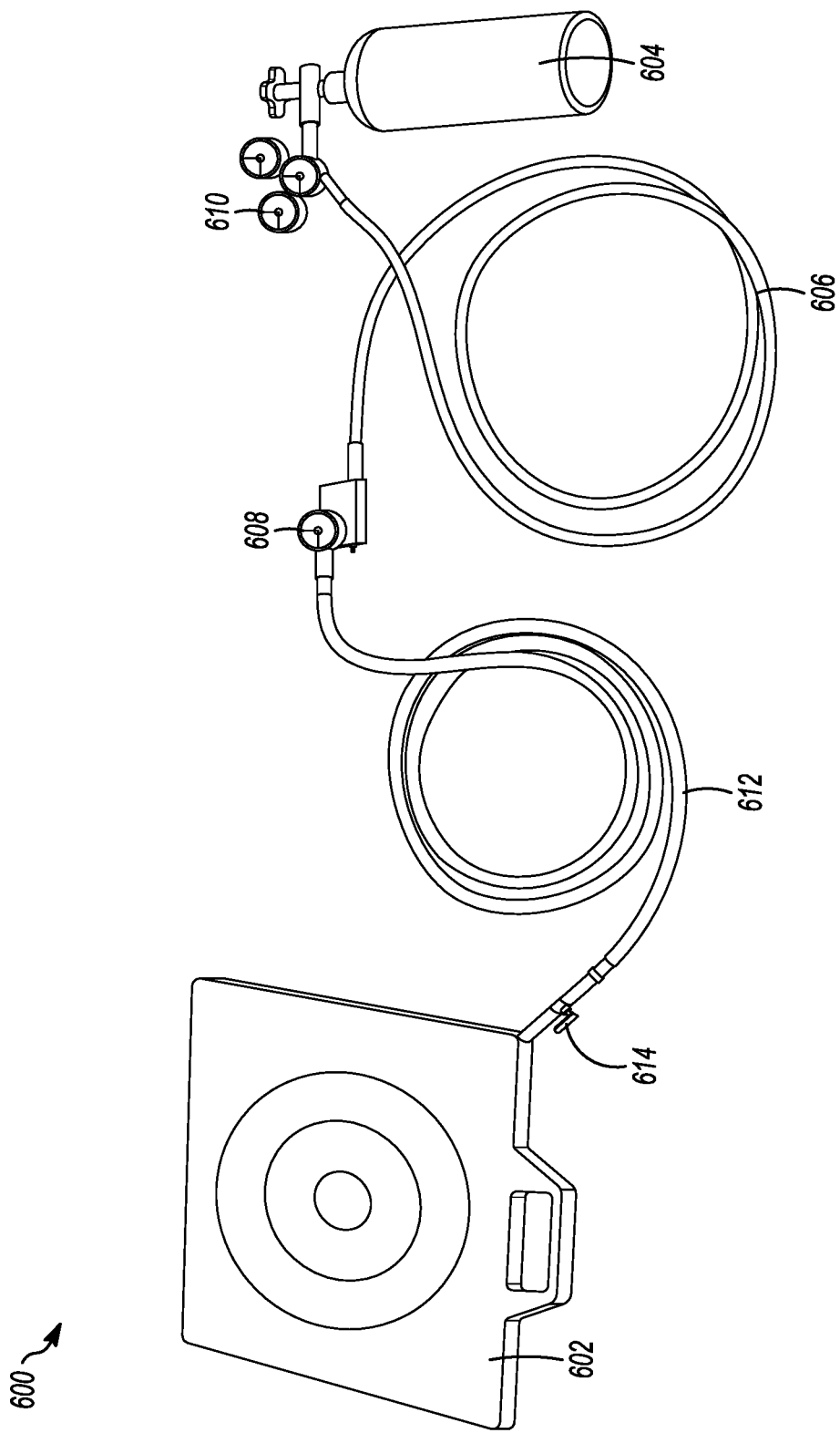
FIGS. 6A-6B illustrate a typical air bladder system for use with the lift system, according to an exemplary alternative of the present disclosure.
Figure 6B:
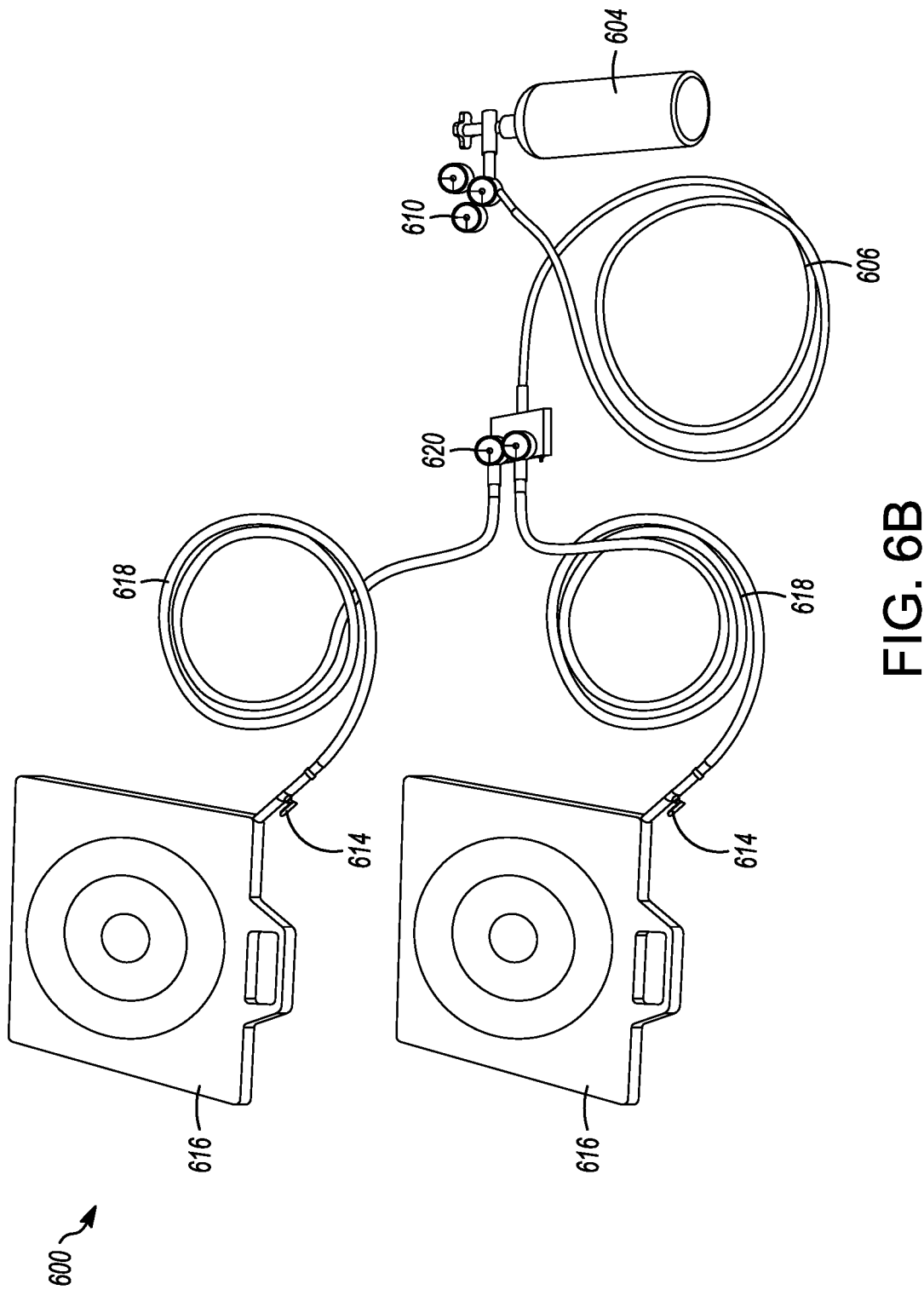

FIGS. 5A-5C illustrate the truck 400 with the pair of spaced apart extensible supports of the lift system 100 at the front of the load bed 126 and the rear of the load bed 126, respectively, for the elevation of the load bed 126 of the truck 400 with the lift system 100 fully extended and the air bladder 116 inflated, according to an exemplary alternative. The operation of the lift system 100 between the fully retracted position and the fully extended position is described earlier. The operation of the lift system 100 from the retracted position towards the extended position and back may be controlled by the driver using the control panel 406 which is connected to each of the pair of spaced apart extensible supports of the lift system 100, using the connection wires 408. The base portion 106 of the at least one extensible ground support stabilizer leg 102 is in contact to the ground surface 118, and the at least one coil spring 122 of the biasing element 120 is stressed under the flanged portion 108 of the at least one extensible ground support stabilizer leg 102. The air bladder 116 is filled with air or fluid from the air source. The air bladder 116 is inflated with the supplied air and raised the support housing 124 above the datum line 302, as shown in FIG. 5A. The support housing 124 moves in relation to the at least one extensible ground support stabilizer leg 102 by the action of the air bladder 116 pushing against the top of the support housing 124, which elevates the load bed 126 at an inclination to level-up with the loading dock. The releasable locking pins 130 are secured into the receiving opening or passage 128 to hold the at least one extensible ground support stabilizer leg 102 at a fixed position against the vertical housing. Therefore, at least one extensible ground support stabilizer leg 102 is in the fully extended position when the air bladder 116 is inflated.

FIGS. 6A-6B illustrate a typical air bladder system 600 for use with the lift system, according to an exemplary alternative. As described earlier, the air bladder 116 may be inflated and deflated using the air source. The typical air bladder system 600 may comprise at least one air bladder 602 coupled with at least one air source 604 using a first supply pipe 606. The first supply pipe 606 may be coupled at one end to the at least one air source 604 and at other end to at least one flow control valve 608. Further, the typical air bladder system 600 may comprise a plurality of pressure regulators 610 coupled to the at least one air source 604 at the one end of the first supply pipe 606. The typical air bladder system 600 may comprise a second supply pipe 612 coupled at one end to the at least one flow control valve 608 and at other end to the at least one air bladder 602. The at least one air source 604 may inflate or deflate the at least one air bladder 602 using the at least one flow control valve 608. It can be noted that the plurality of pressure regulators 610 may be provided to maintain the pressure of air supplied to the at least one air bladder 602. It can also be noted that the at least one flow control valve 608 may be provided to maintain flow of air flowing towards the at least one air bladder 602. Further, the at least one air source 604 may be located proximate the front end of the vehicle, and the plurality of pressure regulators 610 may be located at the dashboard of the driver/operator of the vehicle. In one alternate, the pressure of air flowing towards the at least one air bladder 602 may be controlled either automatically or manual actuated operation of the operator/driver. Further, the other end of the second supply pipe 612 may be provided with a gate valve 614 to manually regulate the flow of air into and out of the at least one air bladder 602, in case the operator fails to control the flow of the air. It can be noted that the gate valve 614 is a male nipple with an airlock to connect with the second supply pipe 612 and the at least one air bladder 602.

In one alternate alternative, as best seen in FIG. 6B, a plurality of air bladders 616 may be coupled to the at least one air source 604. In this case, a plurality of second supply pipes 618 may be coupled at one end to a plurality of flow control valves 620 and at other end to respective air bladders. It can be noted that a vehicle may employ the plurality of air bladders 616 depending upon the size of load bed 126.

Figure 7:
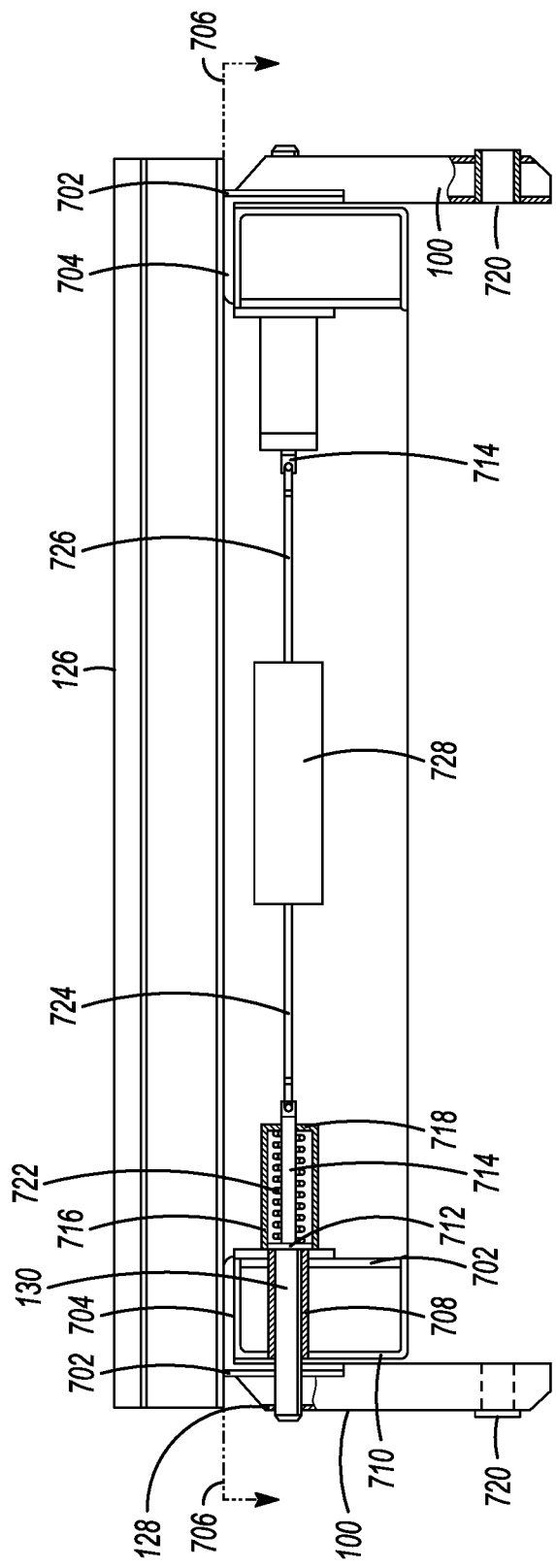

As shown in FIGS. 7, and 8 the vehicle supports of the lift system 100 may be secured to a face plate 702 which may be, in turn, secured to an angle beam 704. The angle beam 704 may be mounted on the underside of a transverse beams 706 which support the load bed 126 of the vehicle.

As shown in FIG. 7, the releasable locking pins 130 may be slidably mounted in sleeves 708 which are supported by longitudinal beams 710 positioned between each pair of vehicle supports. Further, the face plate 702 may be welded to an inner edges of the longitudinal beam 710 and serves to support an inner end of the sleeves 708. The releasable locking pins 130 may comprise a first collar 712 which projects radially outwardly therefrom and serves to bear against the inner end of the sleeves 708 to limit the outward movement of the releasable locking pins 130. Further, the releasable locking pins 130 may comprise a reduced portion 714 of reduced diameter at inner end of the releasable locking pins 130. Further, a tubular housing 716 may be secured to and project radially from the face plate 702. Further, the tubular housing 716 may comprise an end wall 718 formed with a passage which may slidably receive the reduced portion 714 of reduced diameter. Further, a first passage 720 may be integrated on the longitudinal beams 710. In one alternative, a two-way air cylinder 728 may be provided which may extend from the left hand side releasable pin by conduit 724 and to the right hand side releasable pin by conduit 726 and serves to normally urge the releasable locking pins 130 to its extended positions shown in FIG. 3. Further, the two-way air cylinder is controlled by the operator of the vehicle in order to control the air cylinder to release the pins in one instance and lock the pins in another instance.

Further, as shown in FIG. 8, an actuator 802 may be attached towards an outer end of the two-way air cylinder 728. By engaging actuator 802 the releasable locking pins 130 may be manually withdrawn, so that they are drawn inwardly so as to be fully withdrawn from the passages 128. In one alternative, this technique may be used for withdrawing the releasable locking pins 130 from the passages 128 when the load bed 126 is locked in the raised position. In one alternative, by engaging actuator 802, the releasable locking pins 130 may be drawn inwardly so as to be fully withdrawn from the passages 128 formed in each of the two pairs of extensible ground support stabilizer legs 102. It can be noted that the releasable locking pins 130 may be withdrawn from the passages 128 when the chassis of the vehicle is locked in an elevated position.

In use when the vehicle is normally driven on the highway, it will be driven with the load bed 126 in the lowered position shown in FIG. 1. In this position, the releasable locking pins 130 project through the passages 128 and serve to lock the vehicle supports in the retracted position. When the load bed 126 is to be raised, the operator engages actuator 802 to manually withdraw the releasable locking pins 130, and after the releasable locking pins 130 are withdrawn, the extensible ground support stabilizer leg 102 is extended to the ground surface and then air is supplied to the air bladders 116 by activating an air control valve which is located in close proximity to actuator 802. As a result, the air bladders 116 may begin to expand and may serve to raise the load bed 126 to the elevated position. In one alternative, when the load bed 126 has been raised a short distance, the actuator 802 is disengaged, because the releasable locking pins 130 may no longer be aligned with the passages 128. The load bed 126 of the truck may continue to be raised by the air bladders 116 until the releasable locking pins 130 may be aligned with the passages 128. As shown in FIG. 7, the first passages 720 may of a larger diameter than the passages 128.

In one alternative, the releasable locking pins 130 may serve to facilitate the alignment of the releasable locking pins 130 with the first passage 720 and takes into account the angular displacement of the vehicle supports as the releasable locking pins 130 may be extended. In one alternative, the compression springs 722 normally urge the releasable locking pins 130 to their extended position and consequently, when the releasable locking pins 130 are aligned with the passages 128, they may be automatically driven to their extended position to extend through the passages 128. It can be noted that when the releasable locking pins 130 extend through the passages 128, they may serve to provide a positive lock which can prevent both raising and lowering of the load bed without the operator. The lift system 100 may continue to function as non-compliant support legs until the releasable locking pins 130 are withdrawn and the air pressure in the air bladders 116 are vented to permit the vehicle to return to its lowered position, at which time the releasable locking pins 130 will re-enter the passages and serve to lock the load bed 126 in the lowered position.

In one alternate alternative, the lift system 100 eliminates the use of landing gears to save the time of operation to lift the load bed 126. It can be noted that the landing gears are manually operated gear-driven devices operated by hand cranks that require a certain level of physical strength to raise the load bed 126, especially when the vehicle is fully loaded. By removing the reliance on physical strength, the demographic for drivers is greatly expanded and the risk of injury is reduced.

In an alternate exemplary alternative, the lift system 100 may be used to elevate the load bed 126 of the vehicle may provide increased speed and ease of operation which may contribute to a safer, more efficient task of raising or lowering the load bed 126 to match the coupler height of the tow vehicle and to provide a level load bed 126 for forklift truck operators thereby reducing the risk of injury and increasing speed and efficiency of loading and unloading the vehicle.

From the foregoing description, it will be apparent that the present disclosure provides a simple and inexpensive mechanism which provides for the rapid raising and lowering of the load bed 126 of the vehicle in order to achieve the required alignment while ensuring that when the load bed 126 is in the elevated position, it can be retained in the elevated position by a non-compliant structure which provides a mechanical interlock which will not fail in the event of a failure of the elevating mechanism.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the alternatives of the apparatus illustrated and described herein are by way of example, and the scope of the disclosure is not limited to the exact details of construction.

While the above description contains many specificities, these should not be construed as limitations on the scope, but rather as an exemplification of one alternative thereof. It should be understood that the broadest scope of this disclosure includes modifications such as diverse shapes, sizes, and materials. Accordingly, the scope of the present disclosure should be determined, not by the alternatives illustrated, but by the appended claims and their legal equivalents.

While there is shown and described herein certain specific structures embodying various alternatives of the disclosure, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

It may be appreciated by one skilled in the art that additional alternatives may be contemplated. These and other advantages of the mechanism of the present disclosure will be apparent to those skilled in the art.

LIST OF ELEMENTS

100 Lift System
102 At least one extensible ground support stabilizer leg
104 Vertical Housing
106 Base Portion
108 Flanged Portion
114 Top Portion
116 Air Bladder
118 Ground Surface
120 Biasing Element
122 At least one Coil Spring
124 Support Housing
126 Load Bed
128 Receiving Openings/Passages
130 Releasable Locking Pins
302 Datum Line
400 Truck
401 Front wheels
402 Front end of Truck
403 Rear wheels
404 Rear End of Truck
406 Control Panel
408 Connection Wires
600 Air Bladder system
602 At least one Air bladder
604 At least one Air source
606 First Supply Pipe
608 At least one flow control valve
610 Plurality of pressure regulators
612 Second supply Pipe
614 Gate Valve
616 Plurality of Air Bladders
618 Plurality of Second Supply Pipes
620 Plurality of flow control valves
702 Face Plate
704 Angle Beam
706 Transverse Beam
708 Sleeves
710 Longitudinal Beam
712 First Collar
714 Reduced Portion
716 Tubular Housing
718 End Wall of tubular housing
720 First Passage
722 Compression Spring
724 First Conduit
726 Second Conduit
728 Air Cylinder
802 Actuator

What is claimed is:

1. A vehicle load bed lift system comprising a first pair of spaced apart vehicle supports proximate to a front end of the vehicle and a second pair of spaced apart vehicle supports proximate to a rear end of the vehicle, each of said vehicle supports comprising:
   at least one extensible ground support stabilizer leg enclosed within a vertical housing, wherein the at least one extensible ground support stabilizer leg comprises a base portion at one end and a flanged portion at other end;
   said at least one extensible ground support stabilizer leg further comprising a top portion coupled to an air bladder, wherein the at least one extensible ground support stabilizer leg moves along a vertical traction during movement from a fully retracted position to a fully extended position;
   a biasing element enclosed within the vertical housing of the at least one extensible ground support stabilizer leg, wherein the biasing element comprises at least one coil spring compressing under tension when the base portion of the at least one extensible ground support stabilizer leg extends towards a ground surface; and expanding to release tension when the base portion of the at least one extensible ground support stabilizer leg is urged to retract back towards the vertical housing;
   wherein the at least one extensible ground support stabilizer leg comprises releasable locking pins to secure the at least one extensible ground support stabilizer leg in extended, retracted, and other positions in between the fully extended position and the fully retracted position;
   wherein the releasable locking pins are actuated by an air cylinder for movement into and out of receiving openings in the at least one extensible ground support stabilizer leg.

2. The vehicle load bed lift system of claim 1, further comprising a support housing enclosing the air bladder and positioned over the vertical housing of the at least one extensible ground support stabilizer leg.

3. The vehicle load bed lift system of claim 2, wherein the support housing moves along a vertical direction when the at least one extensible ground support stabilizer leg is extended towards the ground surface.

4. The vehicle load bed lift system of claim 2, wherein the support housing is in direct contact with the load bed of the vehicle and lifts the load bed when the air bladder is inflated.

5. The vehicle load bed lift system of claim 2, wherein the support housing is mounted at a bottom end of a chassis of the vehicle.

6. The vehicle load bed lift system of claim 1, wherein the at least one extensible ground support stabilizer leg is locked at multiple positions between the fully retracted position to the fully extended position.

7. The vehicle load bed lift system of claim 1, wherein the at least one extensible ground support stabilizer leg elevates the load bed at the rear end and the front end of the vehicle to align a load with a loading dock.

8. The vehicle load bed lift system of claim 1, wherein the at least one extensible ground support stabilizer leg is secured in a range of positions to allow for height adjustment of the load bed of the vehicle.

9. The vehicle load bed lift system of claim 1, wherein the releasable locking pins are mounted out of a path of the at least one extensible ground support stabilizer leg when disengaged and projecting into the at least one extensible ground support stabilizer leg when a pre-defined locking position is achieved.

10. The vehicle load bed lift system of claim 1, wherein the air bladder when inflated moves the load bed in an upward direction.

11. The vehicle load bed lift system of claim 1, wherein the air bladder when deflated moves the load bed in a downward direction.

12. The vehicle load bed lift system of claim 1, wherein the air bladder is in direct communication with an external air source to inflate and deflate the air bladder when required.

* * * * *